Patented May 31, 1949

2,471,678

UNITED STATES PATENT OFFICE 2,471,678

PROCESS OF DESICCATING LEMON AND LIME JUICES

Earl W. Flosdorf, Forest Grove, Pa., assignor to Lyophile-Cryochem Corporation, Baltimore, Md., a corporation of Maryland No Drawing. Application August 2, 1947, Serial No. 765,805

3 Claims. (Cl. 99—206)

This invention relates to improvements in the preservation of lemon and lime juices, that is, those citrus fruit juices which have a high citric acid content.

Processes for the desiccation of various labile aqueous materials from the frozen state are well known and are now used to a considerable extent for the preservation of biologicals. They may also be successfully applied to the preservation of large numbers of foodstuffs, including orange juice, and other fruit juices, etc. Application of these procedures to the preservation of lemon and lime juices has not been as successful as it has been with other products because the dried material, on storage, tends to darken, such that the reconstituted product has a somewhat muddy color, and while fairly satisfactory to taste, is not as attractive as it should be.

In my prior Patent 2,380,036 I have described improvements in the desiccation of citrus fruit juices from the frozen state which include the incorporation in the juice prior to freezing of a small amount of a crystallizable sugar. In the case of orange juice I have stated that about 1 to 2½% of such sugar gives satisfactory results, and that with lemon juice, somewhat larger quantities of sugar, for example, up to about 5%, are advantageously used. While the procedure described in that patent gives excellent results, particularly with orange juice, in improving the quality of the dried product obtained, specifically with respect to its capacity to resist caking on storage, I have found that with lemon and lime juices there are still difficulties encountered in that after storage for some time, for example, a month or more, there is a tendency of the product to darken and acquire a flavor which is not as attractive as the flavor of the material before drying or as freshly dried.

I have now found that by the addition of substantially larger quantities of sugar, whether crystallizable or not, before freeze drying the lemon or lime juice, an excellent product is obtained which does not exhibit darkening tendencies and retains its excellent flavor on storage. The quantity of sugar required is from about 10% of the weight of the liquid juice up to the limit of solubility of the sugar in the juice or up to the amount which gives a reconstituted product too sweet for its intended use. The sugar which I prefer to use is dextrose, because it is very effective in accomplishing the desired result and is not nearly as sweet as sucrose and hence can be used in substantial quantities without making the reconstituted product unduly sweet. I prefer to use 25% of dextrose based upon the liquid juice, but the amount used may be as little as 10% and may be substantially more than 25%, up to the limit of solubility of the sugar in the juice. Similar quantities of sucrose also give good results from the standpoint of preventing darkening on aging and retaining the taste of the material on storage, but the sucrose tends to sweeten the juice more than is desirable in some cases.

Gelatin, pectin, agar-agar, or other similar protective colloid, in particular gelatin, may be added along with the sugar, in amounts of 0.1 to 2%. These seem to stabilize the product even further when it is dried, and to lessen the hygroscopic nature of the dried material, making it easier to handle. The quantity added must be insufficient to cause jellying upon reconstitution.

The product which is obtained after the addition of the 10% or more of sugar followed by freeze drying is a nearly white powder which maintains excellent characteristics during storage for substantial periods of time, at room temperature, including the temperatures reached in the summer months, and on such storage there is no detectable deterioration of the product, from which can be assumed that the shelf-life of the product for normal distribution is practically unlimited.

The process of the present invention thus involves the addition to lemon or lime juice of 10% or more of sugar, advantageously dextrose, although other sugars, such as sucrose, may be used, followed by subjecting the product to desiccation from the frozen state, by freezing it and subliming off the water while the material is maintained frozen. The final product, which is a nearly white powder, is then transferred to suitable containers such as cans, which are hermetically sealed, for storage or distribution. Because the material is hygroscopic, transfer of the dried product to the container should be carried out in such a way as to minimize absorption of water during the operation. The final product should have a moisture content less than 1%, and if in packaging the product after the desiccation operation is completed all moisture absorption can be prevented desiccation of the product to a final moisture content of 1% or less gives a satisfactory product. If some moisture absorption is a necessary incident to the packaging of the material, the desiccation should be carried to an extent such that, taking into account the water absorption in packaging, the total water content of the final product is not in excess of about 1%.

I claim:

1. In the desiccation of lemon and lime juices by sublimation of water therefrom from the frozen state, the step of adding to the juice before freezing at least about 10%, based on the juice, of a sugar, to prevent the desiccated juice from darkening on storage.

2. The process as in claim 1 in which the sugar is dextrose.

3. The process as in claim 2 in which the quantity of dextrose is about 25% based on the juice.

EARL W. FLOSDORF.

REFERENCES CITED

The following references are of record in the file of this patent:

UNITED STATES PATENTS

| Number | Name | Date |
|---|---|---|
| 2,380,036 | Flosdorf | July 10, 1945 |
| 2,422,588 | Samisch | June 17, 1947 |